United States Patent [19]

Holland

[11] Patent Number: 4,648,233

[45] Date of Patent: Mar. 10, 1987

[54] APPARATUS FOR HANDLING LIQUID FILLED FLEXIBLE PLASTIC BAGS

[75] Inventor: Willard D. Holland, Kenosha, Wis.

[73] Assignee: B-Bar-B, Inc., New Albany, Ind.

[21] Appl. No.: 738,801

[22] Filed: May 29, 1985

[51] Int. Cl.[4] .............................................. B65B 57/00
[52] U.S. Cl. ......................................... 53/55; 53/251; 53/266 R; 414/71
[58] Field of Search .................. 53/55, 244, 249, 251, 53/266 R, 282, 473, 475; 198/375, 468.2, 468.4; 414/67, 71

[56] References Cited

U.S. PATENT DOCUMENTS

| | | |
|---|---|---|
| 3,242,951 | 3/1966 | Curie et al. |
| 3,299,606 | 1/1967 | Weikert |
| 3,306,001 | 2/1967 | Peppler |
| 3,410,050 | 11/1968 | Bell |
| 3,427,646 | 2/1969 | Scholle |
| 3,447,281 | 6/1969 | Buford et al. |
| 3,601,951 | 8/1971 | Bargel et al. |
| 3,618,288 | 11/1971 | Thornton ............................. 53/55 |
| 3,685,624 | 8/1972 | Paddock ........................ 53/244 X |
| 3,699,746 | 10/1972 | Titchenal et al. |
| 3,735,556 | 5/1973 | Dille et al. ..................... 53/251 X |
| 3,778,965 | 12/1973 | O'Lenick et al. |
| 3,820,302 | 6/1974 | Doran et al. |
| 3,864,890 | 2/1975 | Ullman ........................... 53/251 X |
| 4,098,055 | 7/1978 | Calvert ........................... 53/251 X |
| 4,120,134 | 10/1978 | Scholle |
| 4,250,691 | 2/1981 | Marshall |
| 4,253,293 | 3/1981 | Loewenthal |
| 4,297,929 | 11/1981 | Schieser et al. |
| 4,355,493 | 10/1982 | Ellert |
| 4,363,338 | 12/1982 | Brown |
| 4,383,795 | 5/1983 | Wakamatsu et al. ............... 414/753 |
| 4,398,383 | 8/1983 | Prakken |
| 4,494,355 | 1/1985 | Johnson et al. ................... 53/55 X |
| 4,510,737 | 4/1985 | Ellert |

FOREIGN PATENT DOCUMENTS

| | | | |
|---|---|---|---|
| 2904493 | 9/1979 | Fed. Rep. of Germany | 53/251 |
| 2926484 | 1/1981 | Fed. Rep. of Germany | 53/249 |
| 2454987 | 12/1980 | France | 414/71 |

Primary Examiner—John Sipos
Assistant Examiner—Steven P. Weihrouch
Attorney, Agent, or Firm—Biebel, French & Nauman

[57] ABSTRACT

Apparatus for performing the method of the present invention comprises an indexing conveyor bag support defining a pick-up location for filled bags. A bag gripper comprising either clamps or suction cups is provided for gripping filled bags and a bag transporter supports and moves the bag gripper between the pick-up location and a drop-off location. A programmable controller is provided for controlling the bag transporter and the bag gripper such that filled flexible bags are engaged by the bag gripper at the pick-up location, carried from the pick-up location to the drop-off location and deposited at the drop-off location. Preferably, a conveyor is positioned to carry cartons for supporting filled bags to the drop-off location such that filled bags may be inserted into supporting cartons by the method and apparatus of the present invention.

4 Claims, 12 Drawing Figures

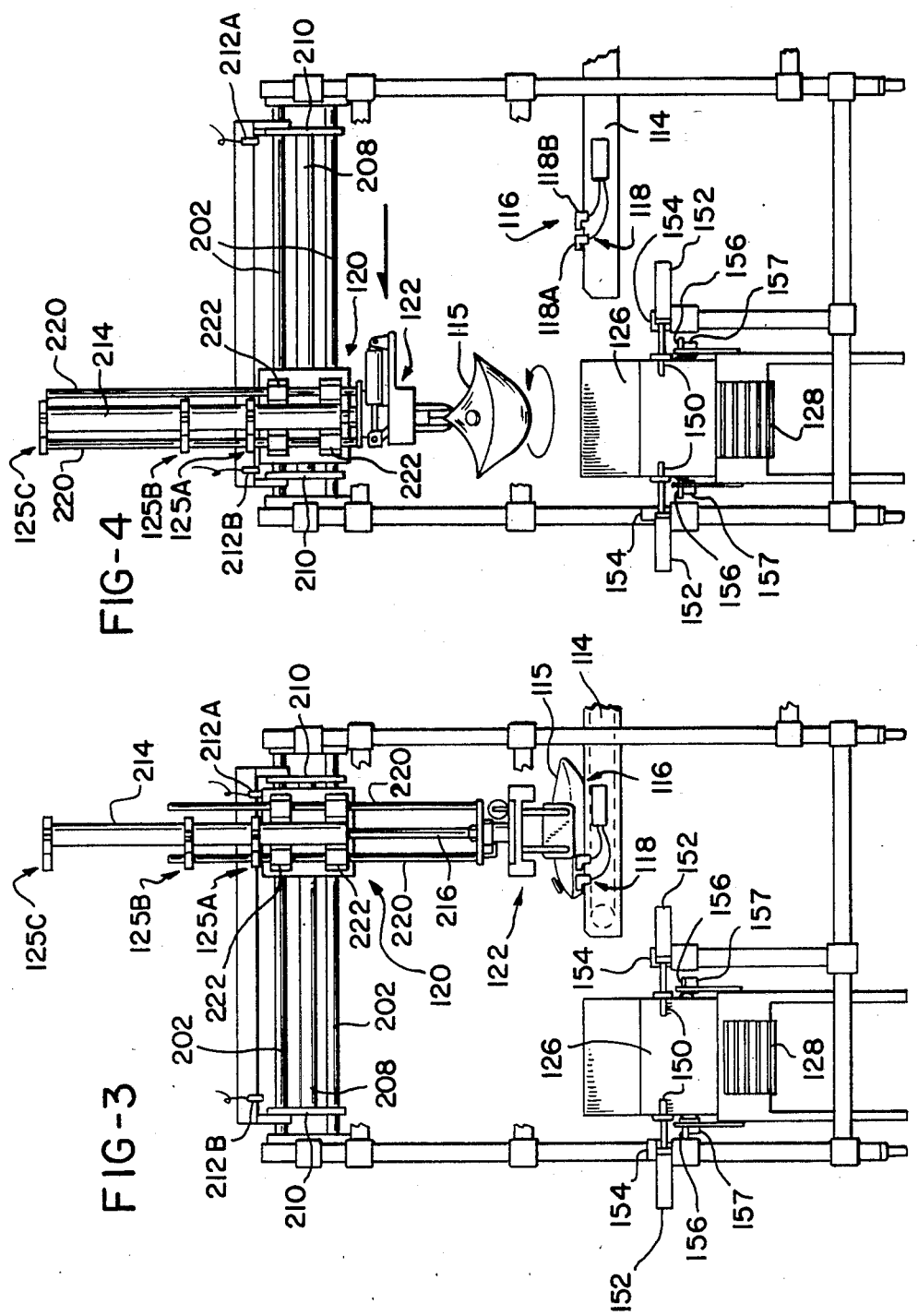

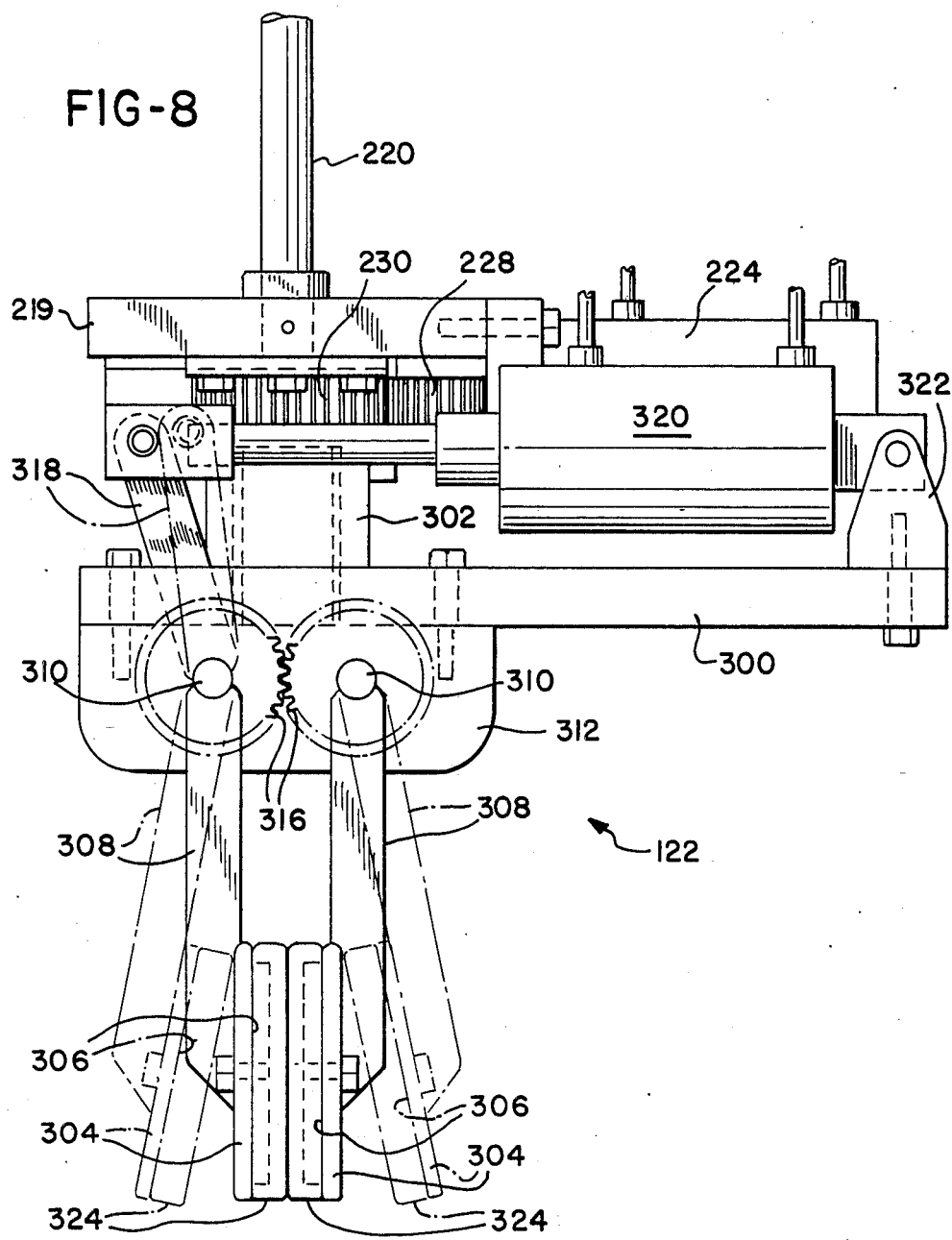

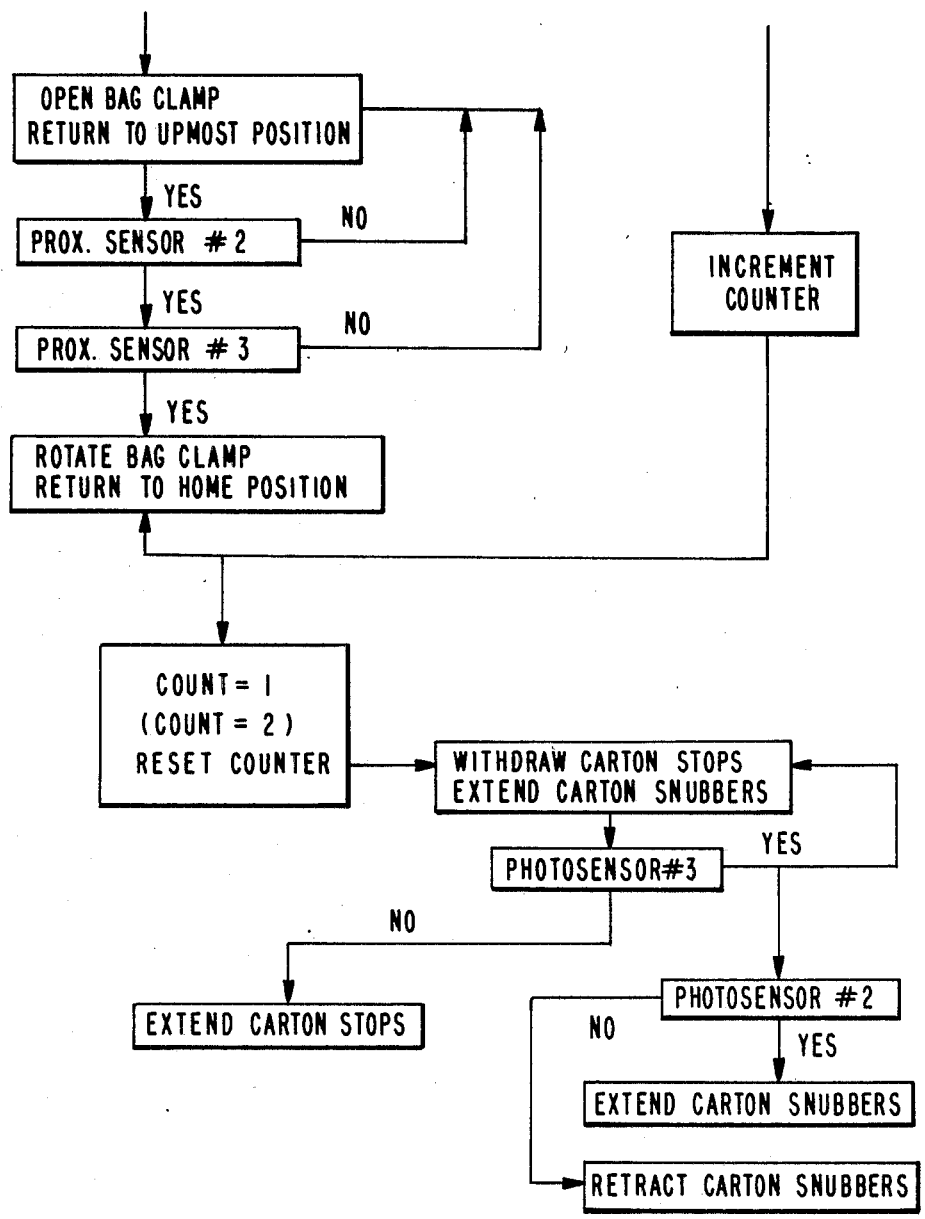

APPARATUS FOR HANDLING LIQUID FILLED FLEXIBLE PLASTIC BAGS

BACKGROUND OF THE INVENTION

This invention relates generally to a method and apparatus for handling flexible packages or bags filled with fluent material and, more particularly, to a method and apparatus for gripping such filled bags at a pick-up location and conveying them to a drop-off location where they are preferably placed into a relatively rigid supporting container or carton.

Flexible plastic packages or bags are frequently used to contain liquids, such as milk, water, fruit juices and the like, and may also be used to contain other fluent materials. The use of plastic bags minimizes the exposure of materials contained therein to contamination and thereby ensures a high degree of sanitation and/or purity. However, such flexible bags, particularly in larger sizes, are unwieldy when filled with a fluent material. Accordingly, filled bags are typically placed in relatively rigid supporting containers or cartons to facilitate handling of the filled bags.

The present invention is concerned with the problem of placing such plastic bags filled with fluent material into corresponding supporting cartons without tearing or opening the bags. Placement of the filled bags into the cartons raises unique problems primarily due to the unwieldy nature of the filled bags which tend to expand in any unconstrained direction. Further, some materials from which the flexible bags are made tend to stick or adhere to the sides of the supporting cartons and, hence, may present additional problems when such a filled bag is inserted into such a carton.

In the prior art, fluid filled flexible bags have been inserted into supporting containers or cartons manually by hand packing the bags into the cartons. With hand packing, the bags tend to assume a teardrop form which facilitates placement of the filled bags into the cartons. However, hand packing is slow, tends to be inconsistent and, of course, incurs the expense of a human operator to perform the hand packing operation. To overcome these problems, fluid filled bags have been dropped from the ends of bag conveyors or inserted into cartons by means of variously shaped chutes and outwardly and inwardly expanding funnels. Unfortunately, none of the known prior art techniques fully satisfy the unique requirements for handling and packaging flexible bags filled with fluent material.

It is, therefore, apparent that a need exists for an efficient and cost effective method and apparatus for handling flexible bags filled with fluent material and for inserting such filled bags into relatively rigid supporting containers or cartons to replace prior art manual packing and gravity packing directly or through variously shaped chutes and funnels.

SUMMARY OF THE INVENTION

The method and apparatus in accordance with the present invention for transporting flexible bags filled with fluent material overcomes the handling problems encountered in the prior art by mechanically picking up such filled bags at a pick-up location and carrying them to a desired drop-off location where the bags are deposited. Preferably, a relatively rigid supporting container or carton is positioned at the drop-off location such that at least one filled bag is deposited into the carton in accordance with the method and apparatus of the present application.

The flexible packages which are intended to be handled by the present invention typically comprise flexible plastic bags which are filled with a liquid or other fluent material by means of any one of a number of known bag filling machines. In accordance with the method of the present invention for handling flexible bags filled with fluent material, a filled bag is moved to a pick-up location where its presence is sensed by an appropriate sensing device. Gripping means positioned over the pick-up location are lowered to a position adjacent to the filled bag and activated to grip the bag. The filled bag is then raised to a position such that the lowest point of the bag is clear of the pick-up location where it was previously supported. The filled bag is then conveyed to a drop-off location where it is lowered to a position where the bag may be at least partially supported and the gripping means is de-activated to deposit the filled bag at the drop-off location. The gripping means is returned to its home position over the pick-up location where it is available to handle the next filled bag which is conveyed to the pick-up location.

Preferably, the method comprises an additional step of positioning a relatively rigid supporting container or carton at the drop-off location such that the filled bag is lowered into the carton. To properly orient the filled bag relative to the carton, the method may further comprise the step of rotating the gripping means by an appropriate amount to ensure such relative orientation. The step of activating gripping means may comprise closing clamping means or applying vacuum to suction means depending upon the gripping means provided for the apparatus performing the method.

Apparatus in accordance with the present invention for handling flexible bags filled with fluent material comprises bag supporting means defining a pick-up location for the filled bags. Bag gripper means are provided for gripping the flexible bags and bag transport means support and move the bag gripper means between the pick-up location and a drop-off location. Sequencer means is provided for controlling the bag transport means and the gripper means such that filled flexible bags are engaged by the bag gripper means at the pick-up location, carried from the pick-up location to the drop-off location, and deposited at the drop-off location.

The bag gripper means of the present invention may comprise a pair of clamping members defining bag clamping faces with resilient means secured to the clamping faces for engaging the filled flexible bags. Preferably, the resilient means comprises clamping pads formed of 70 durometer polyurethane which completely cover the clamping faces. The clamping members engage a portion of the upper surface of the filled bags such that the bags are supported to form a tear drop profile to facilitate insertion into a supporting container or carton.

Alternately, the bag gripper means may comprise suction means for applying vacuum to filled bags. The suction means preferably comprises a plurality of suction cups to provide sufficient area for gripping filled bags without damaging the bags and the suction cups may be clustered together. By clustering the suction cups, filled bags are supported to form a tear drop profile to facilitate insertion into a supporting container or carton. The suction cup embodiment of the bag gripper means may be preferred for certain fluent materials. For example, materials which are granular in nature may tend to damage the flexible bag if gripped by the clamping members previously described.

Preferably, the flexible bag supporting means of the apparatus comprises an indexing conveyor which can be associated with any appropriate bag filling apparatus such that flexible bags filled with fluent material are conveyed from a bag filling location to the pick-up location. The supporting containers or cartons are also preferably carried to the drop-off location by conveyor means such that filled bags may be inserted into the cartons by the apparatus of the present invention. A container conveyor also facilitates automation of the fluent material packaging system which incorporates the present invention.

To automate the operation of the apparatus, first sensing means are mounted adjacent to the indexing conveyor for sensing the presence of filled bags at the pick-up location and for generating filled bag present signals indicative thereof. Second sensing means are mounted adjacent to the container conveyor means for sensing the presence of a supporting container at the drop-off location and for generating container present signals indicative thereof. For automation, the sequencer means is responsive to the filled bag present signals and the container present signals to control movement of the bag transport means and operation of the bag gripper means such that filled bags are transported from the pick-up location to the drop-off location where the bags are inserted into the supporting containers.

Since the orientation of bags at the filling apparatus may not correspond to the orientation of supporting containers or cartons into which they are to be inserted due to the layout of a packaging facility, the gripper means is mounted for rotation relative to the bag transport means. The sequencer means can control the transport means to rotate the bag gripper means and thereby properly align a filled bag with a supporting container into which the filled bag is to be inserted.

The discharge height of a bag coming from a filling machine may also be different from the height of a container into which the bag is to be inserted. Accordingly, the bag gripper means is mounted for vertical movement by the bag transport means and further comprises bag gripper height sensor means for sensing the vertical position of the bag gripper means and generating vertical position signals representative thereof. The sequencer means is further responsive to the vertical position signals for controlling the vertical position of the bag gripper means such that a filled bag may be picked up at one elevation, carried at a second elevation and deposited at a third elevation.

It is, therefore, an object of the present invention to provide an improved method and apparatus for transporting flexible bags filled with fluent material and for inserting such bags into supporting containers or cartons.

Other objects and advantages of the invention will be apparent from the following description, the accompanying drawings and the appended claims.

BRIEF DESCRIPTION OF THE DRAWINGS

FIGS. 3–5 show the sequential operating steps of filled bag handling in accordance with the present invention.

FIG. 8 shows the operation of the bag gripping apparatus of FIGS. 6 and 7.

FIGS. 11A and 11B form a flow diagram for controlling the illustrated apparatus in accordance with the present invention.

DETAILED DESCRIPTION OF THE INVENTION

Figure 1:
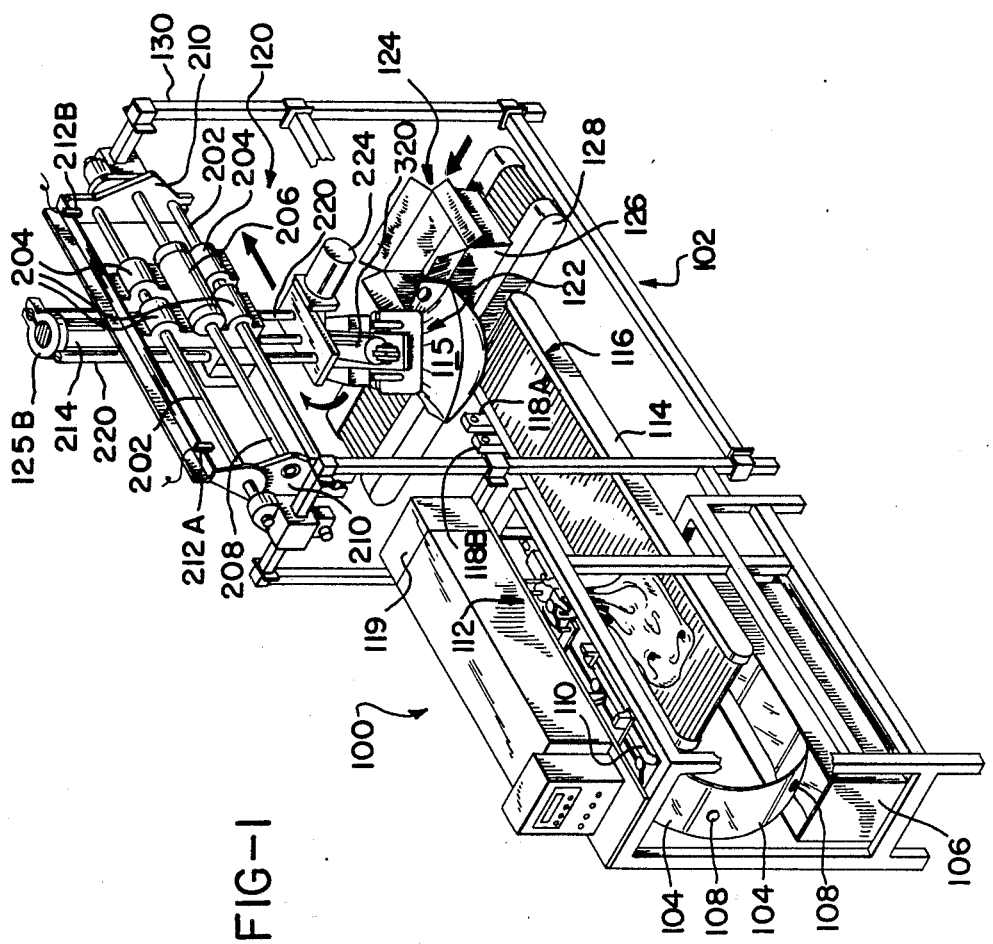
FIG. 1 is a perspective view of a flexible bag processing station incorporating an illustrative embodiment of the invention of the present application.

The flexible bag processing station of FIG. 1 includes a flexible bag filling machine 100 which produces flexible packages or bags filled with liquid or other fluent material. Such filled bags are handled by handling apparatus 102 in accordance with the present invention. In the bag filling machine 100, a continuous source of flexible containers or bags 104 are fan-folded or otherwise packaged in a supply box 106. Each of the bags 104 includes a capped spout 108 which is positioned near the leading end of the bag as it is passed into the filling machine 100. The spouts 108 are received between guide rails 110 and passed to a filling station 112 where a cap associated with the spout 108 is removed and the bag is filled. Once filled, the cap is replaced and the bag is released from the filling station 112 onto an indexing conveyor 114.

A variety of bag filling machines are known in the prior art and may be used with the present invention. One such filling machine is disclosed in U.S. Pat. No. 4,510,737, which issued Apr. 16, 1985, to the assignee of the present application and is incorporated herein by reference. The referenced patent may be consulted for additional detail regarding the bag filling machine 100.

Once filled and deposited onto the indexing conveyor 114, a filled bag 115 is moved to a pick-up location 116 adjacent the far end of the indexing conveyor 114. The arrival of the filled bag 115 at the pick-up location 116 is detected by sensors 118 which generate filled bag present signals 119 received by sequencer means 120 to control the bag transporting means 120 and bag gripper means 122 to grip the filled bag 115 and transport it toward a drop-off location 124. The sensors 118 also signal the filling apparatus 100 to commence filling of the next flexible bag upon detection of a filled bag at the pick-up location 116. In the illustrated embodiment of FIGS. 1–5, the drop-off location 124 comprises a supporting container or carton conveyor such that a supporting carton 126 is positioned at the drop-off location 124 to receive the filled bag 115 from the bag gripper means 122.

The following is an overview of the operation of the flexible bag processing station of FIG. 1. Flexible bags 104 contained within the box 106 are conveyed through the filling machine 100 wherein individual bags are severed from the continuous source of bags, filled and capped at the filling station 112. Once filled and capped, the flexible container or filled bag 115 is deposited on the indexing conveyor 114 and conveyed to the pick-up location 116 where its presence is detected by the sensors 118. Upon detection by the sensors 118, the bag transporting means 120 lowers the bag gripper means 122 such that the bag gripper means 122 is adjacent to the filled bag 115 at the pick-up location 116 and the bag gripper means 122 is then activated to grip the filled bag 115. The bag transport means 120 then raises the bag gripper means 122 to a position such that the filled bag 115 is clear of the indexing conveyor 114 and the filled bag 115 is transported horizontally toward the drop-off location 124 where it is to be deposited.

As can be seen in FIG. 1, a supporting carton 126 is positioned at the drop-off location 124 such that the filled bag 115 may be deposited into the carton 126. In the illustrated embodiment, it is convenient to orient the carton transporting conveyor 128 at a right angle relative to the filled bag indexing conveyor 114. Due to this orientation, the carton 126 and the filled bag 115 are not properly aligned for the filled bag 115 to be inserted into the carton 126 if the bag is only picked up and carried horizontally to the drop-off location 124. Accordingly, the bag gripper means 122 is rotated to properly orient the filled bag 115 relative to the bag supporting carton 126 into which it is to be inserted.

Figure 2:
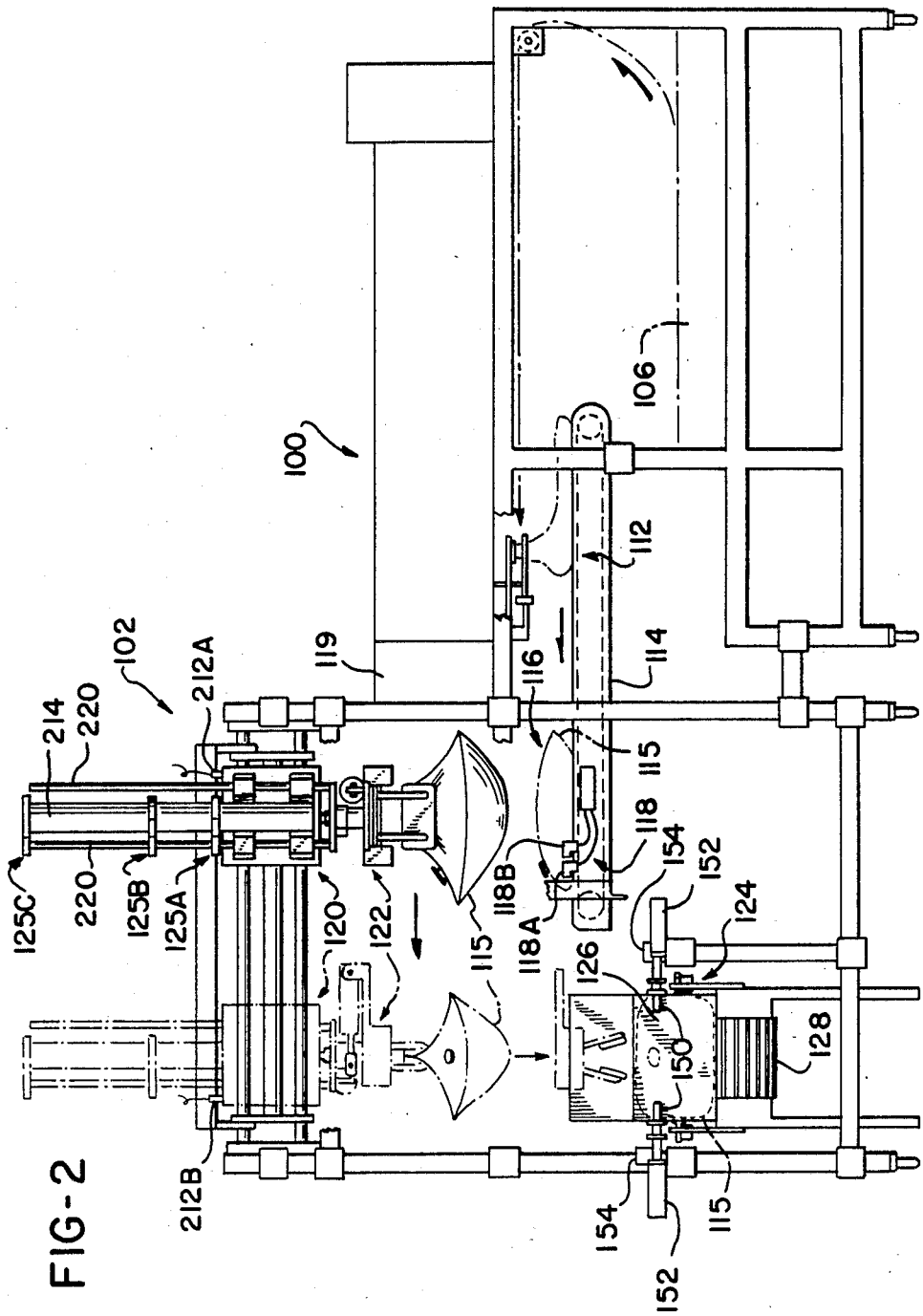
FIG. 2 is a rear view of the flexible bag processing station of FIG. 1.
Figure 5:
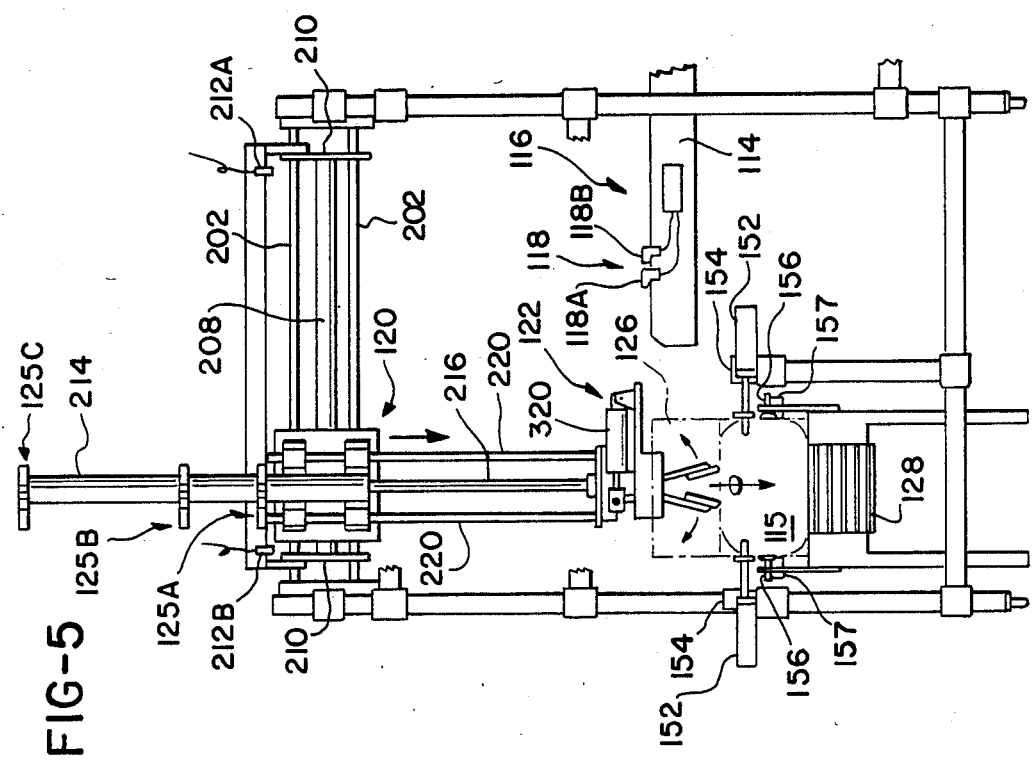

Once the filled bag 115 has been inserted into the carton 126, the gripper means 122 is opened and the bag gripper means 122 is raised by the bag transporting means 120 and conveyed to an initial or home position above the bag pick-up location 116 as best shown in FIG. 2. The bag gripper means 122 is rotated to be properly oriented with the filled bag which is or will be positioned at the pick-up location 116. This sequence of events for handling filled bags is illustrated in FIGS. 2–5, with FIG. 2 showing a composite of the various steps, and FIGS. 3–5 showing individualized positions of the machine as it performs the operations described.

Figure 6:
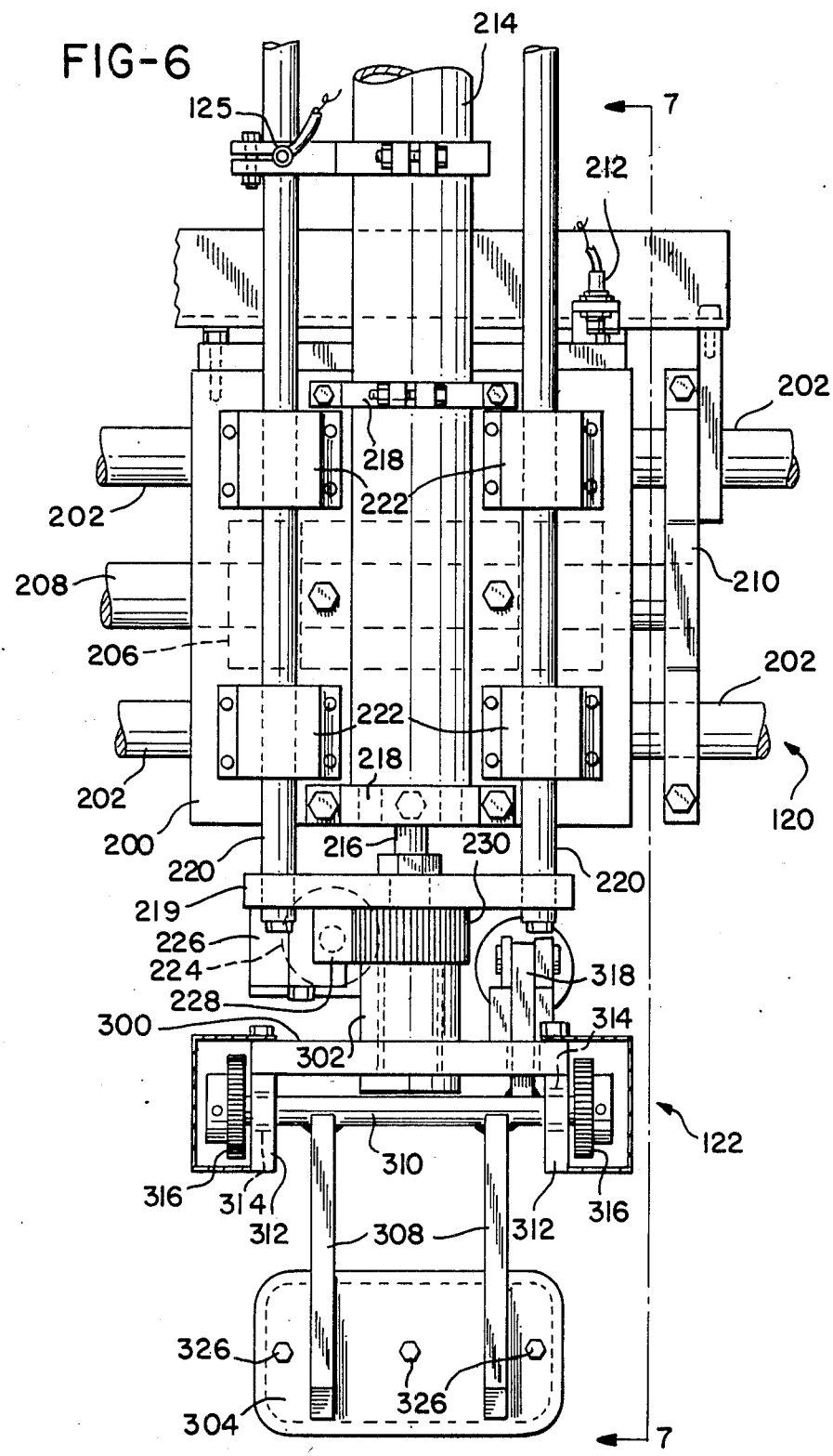
FIGS. 6 and 7 show bag transporting and gripping apparatus in accordance with an illustrative embodiment of the present invention.
Figure 7:
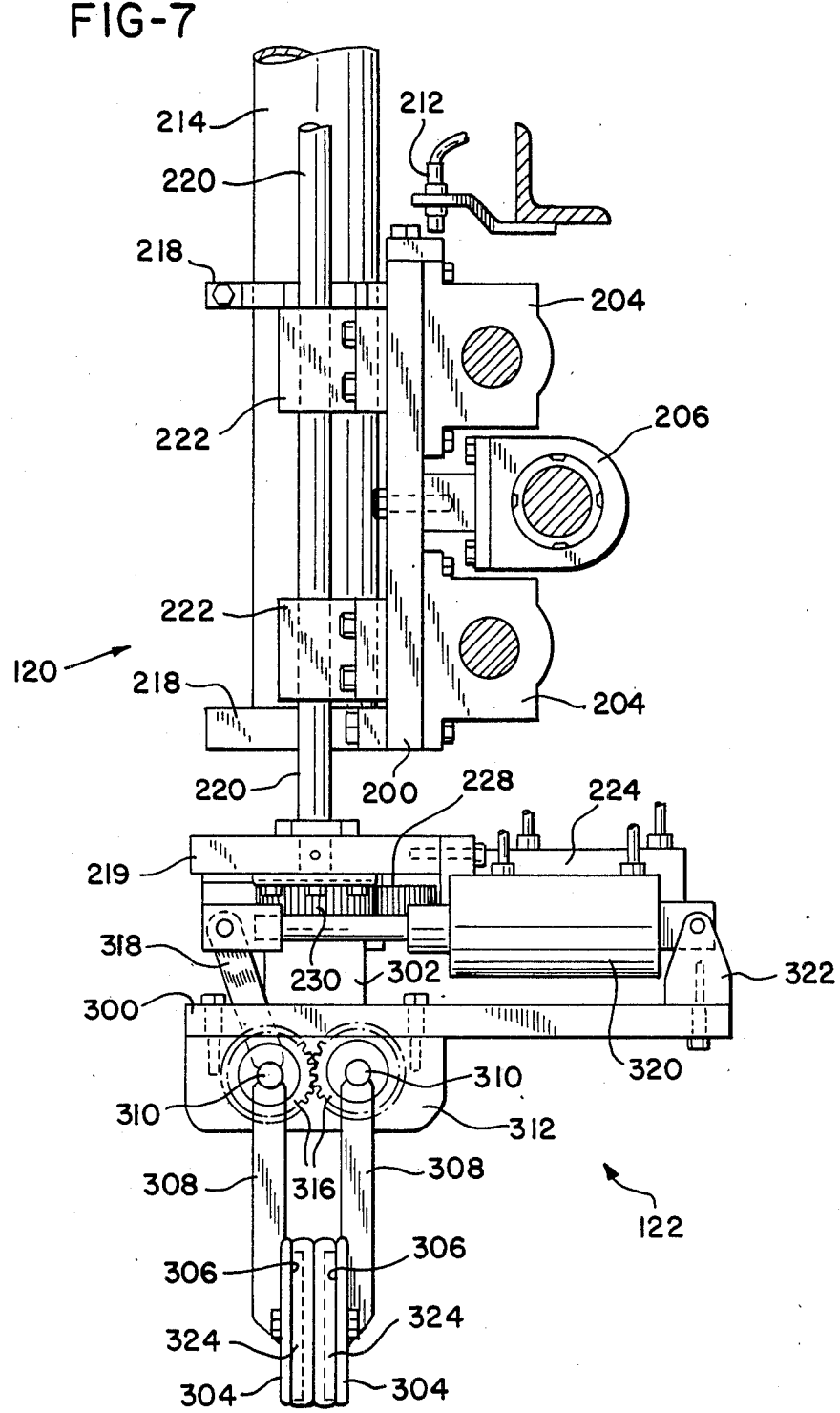

An illustrative construction of the bag transporting means 120 and the bag gripper means 122 is shown in more detail in FIGS. 6–8 to which reference should now be made. The bag transporting means 120 comprises a vertical base plate 200 which is mounted for movement along two horizontal support rods 202 which are in turn mounted to support framework 130 shown in FIG. 1. Four horizontal bushings 204 are securely mounted to the rear of the vertical base plate 200 as shown in FIGS. 1 and 7 for receiving the horizontal support rods 202 and permitting linear movement of the bag transporting means 120 along the support rods 202. Preferably, the bushings 204 are linear ball bushings to ensure free movement of the bag transporting means 120 along the support rods 202.

A rodless linear drive cylinder 206 driven by air in the illustrated embodiment is also secured to the back of the base plate 200 to drive or move the bag transporting means 120 along the linear support rods 202. The rodless cylinder 206 includes a cylinder barrel 208 which is secured between end mounting brackets 210 at either end of the support frame 130 of the handling apparatus 102. Rodless cylinders are well known in the art and commercially available, for example, from Festo Corporation. It will be apparent to those skilled in the art that by applying a driving fluid, such as air, to the ends of the cylinder barrel 208, the bag transporting means 120 is moved in either direction along the horizontal supporting rods 202. While a rodless air cylinder is shown in the illustrated embodiment, it is noted that other types of air cylinders or other drive elements may be utilized and are contemplated in accordance with the present invention.

The horizontal position of the bag transporting means 120 along the support rods 202 is detected by proximity sensors 212. One proximity sensor 212A is mounted to detect the bag transporting means 120 when it is positioned at the pick-up location 116, and one proximity sensor 212B is mounted to detect the bag transporting means 120 when it is positioned at the drop-off location 124.

In the illustrated embodiment, the bag transporting means 120 further comprises a vertically oriented air cylinder 214 having a driven piston rod 216 which may be extended and retracted from the lower end of the air cylinder 214. It is noted that drive elements other than air cylinders may be utilized in place of the air cylinder 214, and that such drive elements are contemplated in accordance with the present invention. The air cylinder 214 is secured to the front of the vertical base plate 200 by means of clamps 218. The lower end of the piston rod 216 is secured to a horizontal base plate 219 which may be moved vertically relative to the remainder of the bag transporting means 120. Vertical stabilizing rods 220 are similarly secured to the vertical base plate 219 to extend vertically upwardly therefrom. The vertical stabilizing rods 220 pass through vertically oriented bushings 222 which are secured to the front of the vertical base plate 200 of the bag transporting means 120.

The bushings 222 are similar to the bushings 204 as previously described relative to horizontal movement of the bag transporting means 120; however, the bushings 222 are oriented at 90° angles relative to the bushings 204. The bushings 222 are preferably linear ball bushings to facilitate vertical movement of the vertical alignment rods 220 through the bushings 222. The vertical positioning or height of the bag gripper means 122 is detected by means of proximity sensors 125 which are adjustably mounted to the air cylinder 214 and sense the positioning of one of the vertical stabilizing rods 220 to thereby determine the height of the bag gripper means 122 relative to the vertically fixed portion of the bag transporting means 120. By adjusting the positions of the sensors 125 along the air cylinder 214, a variety of vertical working positions may be defined for the handling apparatus 102.

The bag gripper means 122 comprises a gripper base plate 300 which includes a barrel 302 secured thereto and extending upwardly therefrom. The gripper base plate 300 is mounted to the horizontal base plate 219 via the barrel 302 such that it may be rotated relative to the horizontal base plate 219. Rotation of the gripper base plate 300 is controlled by an air cylinder 224 which forms a part of the bag transporting means 120 and is mounted to the horizontal base plate 219 by means of a cylinder mounting plate 226 secured to the horizontal base plate 219. The air cylinder 224 drives a rack 228 which, in turn, engages a pinion 230 which is secured to the barrel 302 extending from the gripper base plate 300. The bag transporting means 120 may thus rotate the bag gripper means 122 by a desired angular amount by activating the air cylinder 224.

A pair of clamping members 304 define enlarged bag clamping faces 306 with the clamping members 304 being supported by arms 308 which are in turn secured to clamping pivot rods 310. The clamping pivot rods 310 are supported by vertical clamping support members 312 secured to and extending vertically downwardly from the gripper base plate 300. Appropriate bearings 314 within the support members 312 support the gripping rods 310 to facilitate rotation of the clamping pivot rods 310. The rods 310 are geared to one another through intermeshing gears 316 positioned beyond the support members 312 such that the clamping members 304 are moved in synchronism away from one another or toward one another as the clamping pivot rods 310 are rotated. A lever arm 318 is secured to one of the clamping pivot rods 310 to thereby rotate both rods 310 through the gears 316 and, hence, cause the clamping members 304 to move toward one another to a bag gripping position or away from one another to a bag release position. The lever arm 318 is driven by an air cylinder 320 which is supported from the gripper base plate 300 by means of a trunion 322. Of course, drive elements other than the air cylinder 320 can be used and are contemplated in accordance with the present invention.

Resilient means are secured to the clamping faces 306 of the clamping members 304 for engaging filled flexible bags to be carried in accordance with the method and apparatus of the present invention. While a variety of resilient means, such as small spaced pads or the like, may be utilized, preferably, the resilient means comprises resilient clamping pads 324 which are secured to the clamping members 304 by means of bolts 326 or otherwise. A working embodiment of the present invention has been constructed utilizing 70 durometer polyurethane for the resilient clamping pads 324 which completely cover the clamping faces 306 of the clamping members 304. This embodiment ensures that a substantial portion of the upper surfaces of the filled bags may be progressively engaged by the enlarged bag clamping faces 306 such that the filled bags are clamped but not damaged.

Figure 9:
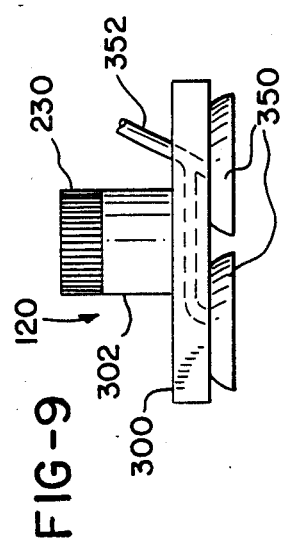
FIGS. 9 and 10 show an alternate embodiment of a bag gripper for use in the present invention.
Figure 10:
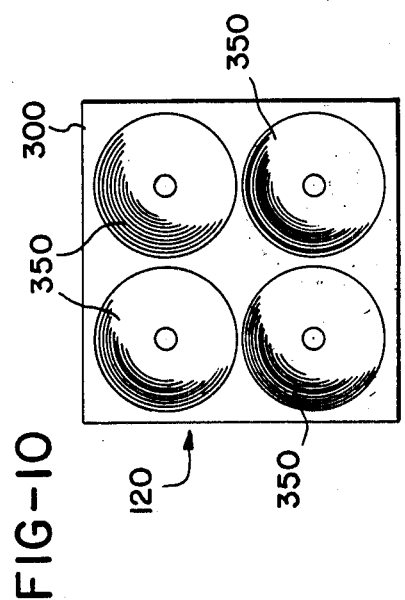

FIGS. 9 and 10 show an alternate embodiment of the gripping means 120 wherein the bag gripping means comprises suction means for applying vacuum to filled bags. Similar parts relating to the bag gripping means in FIGS. 6–10 are numbered the same. In the illustrated embodiment, the suction means comprises a plurality of suction cups 350 to which vacuum may be selectively applied through a suction hose 352. The total area of the suction cups 350 is selected to grip and support a filled bag to be transported, yet not cause damage to the filled bag. In the illustrated embodiment of FIGS. 9 and 10, four (4) clustered cups 350 each having a three (3) inch diameter are employed. By clustering the suction cups 350 as shown in FIGS. 9 and 10, the filled bags assume a tear drop configuration when lifted to facilitate insertion of the bags into a supporting carton. Suction gripping means such as that shown in FIGS. 9 and 10 may be preferred in certain applications, for example, if the fluent material being packaged is granular in nature such that the clamping means of FIGS. 6–8 may cause the granules to damage the bags as they are clamped.

Control of the carton conveyor 128 has been omitted from FIG. 1 for simplicity of illustration. The control of the conveyor 128 is best shown in FIGS. 2–4. In those figures, carton restraining members 150 are controlled by air cylinders 152 such that they may be inserted to the position shown to retain the carton 126 at the drop-off location 124. Carton sensing means 154, such as photodetectors, can be positioned adjacent to the air cylinders 152 to sense when a carton has been moved to the drop-off location 124. As previously indicated, the carton sensing means 154 generates carton present signals which are used by the sequencer means 119 to control the handling apparatus 102 to deposit a filled bag into a carton. Once a carton has been thus filled, the carton restraining members 150 are withdrawn by the air cylinders 152 such that the filled carton may be conveyed from the bag processing station via the conveyor 128.

To ensure that only one carton is at the drop-off location 124, carton snubbers 156 are forced into engagement with the next carton to be conveyed to the drop-off location 124 on the conveyor 128. Once the carton sensing means 154 signals that a carton has exited from the conveyor 128, the snubbers 156 are released and the carton holding pins 150 are inserted such that the next carton in line is conveyed to the drop-off location 124 for a filled bag to be inserted thereinto. Photosensors 157 are associated with the carton snubbers 156 to facilitate conveyance of supporting cartons to the drop-off location 124.

Operation of the flexible bag processing station, including the bag handling invention of the present application, will now be described. A flexible bag 104 is filled and capped at the bag filling station 112 of the bag filling machine 100 and deposited onto the conveyor 114. It will be presumed that this is the first bag to be processed by the bag processing station or that the preceeding bag has been completely processed such that the bag handling apparatus 102 has been returned to an initialized or home position over the pick-up location 116. In the home position, the bag gripper means 122 is raised to its uppermost position as indicated by the height sensor 125C sensing one of the vertical stabilizing rods 220 and the bag gripper means 122 is deactivated, i.e., in the case of the bag gripper of FIGS. 1–8, the clamping members 304 are opened, and in the gripper means of FIGS. 9 and 10, vacuum is not applied to the suction cups 350.

Since no bag is detected by the sensors 118, the filling machine upon depositing the filled bag 115 upon the indexing conveyor 114 will activate the indexing conveyor 114 to move the filled bag 115 to the pick-up location 116 where it is sensed by the sensors 118, for example, photodetectors. The sensor 118B signals the sequencer means 119 to activate the bag handling apparatus 102 to carry the filled bag 115 from the pick-up location 116 to the drop-off location 124. When the filled bag 115 has moved sufficiently along the conveyor 114 to be sensed by the sensor 118A, the conveyor 114 is stopped and the bag filling machine 100 commences to advance and fill the next bag 104 from the box 106.

Upon a bag being sensed by the sensor 118B, the bag gripper means 122 is lowered to a position adjacent to the filled bag 115 located at the pick-up location 116. This position is best shown in FIG. 3 with the vertical height of the package gripper means 122 being sensed by the proximity sensor 125B sensing the position of one of the vertical stabilizing rods 220. Once in the position shown in FIG. 3, the gripping means 122 is activated as previously described to engage the filled bag 115. The gripper means 122 together with the gripped filled bag 115 is raised to a carry position indicated by the proximity sensor 125C sensing one of the vertical stabilizing rods 220 such that the lowermost portion of the filled bag 115 is free of the indexing conveyor 114 which previously supported it.

The bag transporting means 120 is then moved to the left from the position shown in FIG. 3 to the position shown in FIG. 4 with the position of the bag transporting means 120 being sensed by the left proximity sensor 212B as shown in FIG. 4. Preferably, the air cylinder 224 is operated during the time that the bag handling apparatus 120 is moved from the position shown in FIG. 3 to the position shown in FIG. 4 such that the gripper means 122 and the filled bag 115 have been rotated to a position in alignment with the carton 126 by the time the bag transporting apparatus 120 has been moved to the position shown in FIG. 4. Of course, the gripper means 122 could be rotated at any point in its travel from the pick-up location 116 to the drop-off location 124.

If a carton 126 has been stopped by the members 150 such that it is located at the drop-off location 124 and, hence, sensed by the carton sensing means 154, the sequencer means 119 will be enabled to lower the gripper means 122 toward the drop-off location 124. The gripper means 122 is lowered to a position signaled by the proximity sensor 125A sensing one of the vertical stabilizing rods 220 such that the filled bag 115 is inserted into the carton 126 at the drop-off location 124. Upon attaining the position signaled by the proximity sensor 125A as shown in FIG. 5, the gripper means 122 is deactivated to thereby deposit the filled bag 115 within the carton 126.

At this time, the gripper means 122 is raised to its uppermost position as signaled by the proximity sensor 125C, and the bag transporting means 120 is moved to the right to its position shown in FIG. 3 as sensed by the right-most proximity sensor 212A. This initializes the position of the bag handling apparatus 102 such that it is ready to engage the next filled bag which is sensed by the sensor 118B of the sensors 118. As the bag handling apparatus 102 is returned to its initialized position, the conveyor 128 and container handling apparatus previously described permits a filled carton to be removed by the conveyor 128 and an empty carton to be moved to the drop-off location 124 where it is sensed by carton sensing means 154. The next filled bag will either be awaiting the package handling apparatus 102 or will soon be detected by the sensors 118 such that operation of the bag processing station may be continued on an automated basis.

Figure 11A:
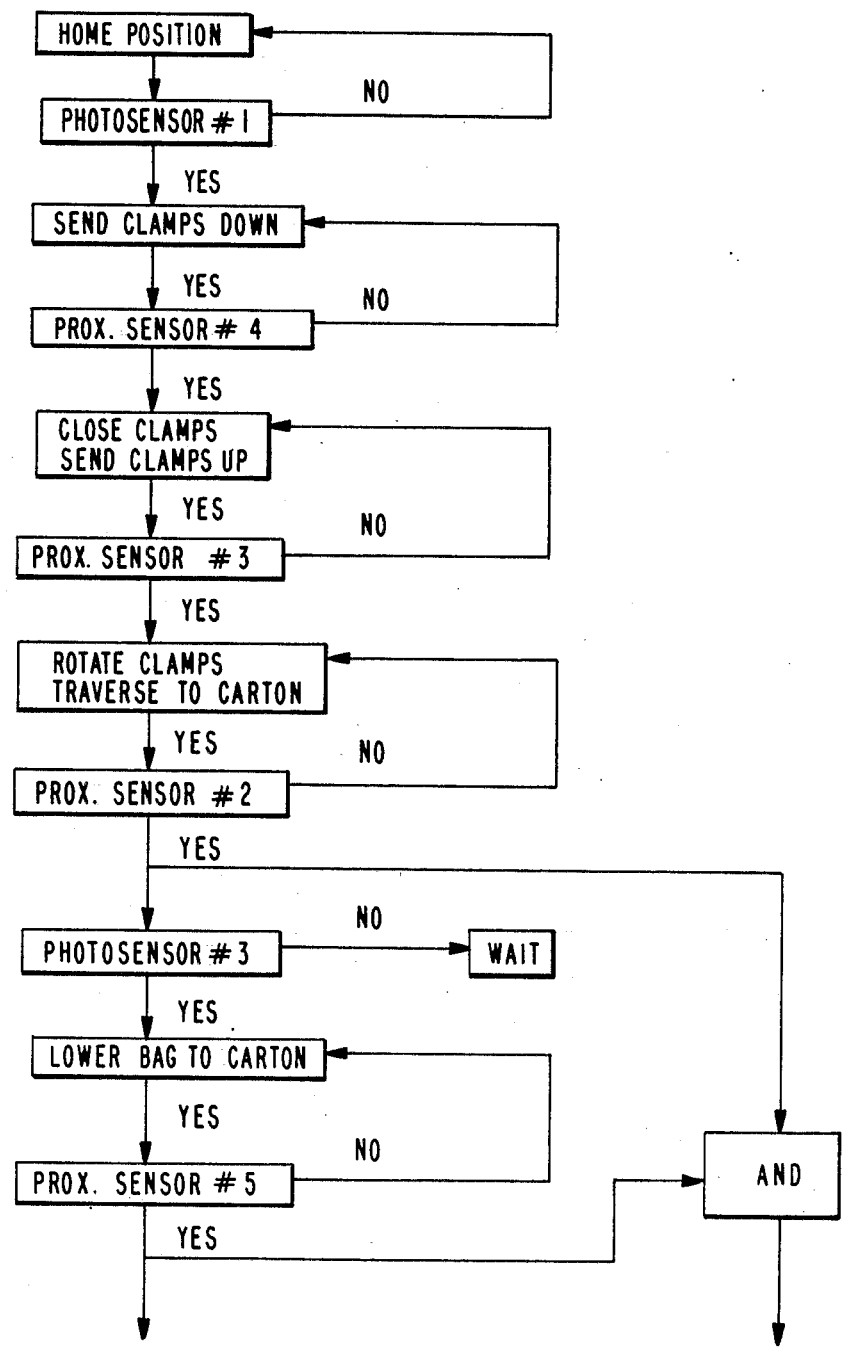

In a working embodiment of the present invention, the sequencer means 119 comprises a programmable controller Model SYSMAC-S6, available from Omron Electronics Inc., which was programmed to perform the sequences as described in the present application and shown in the flow chart of FIGS. 11A and 11B. In FIG. 11B, a counter may be set to 1 or 2 to designate whether one or two filled bags are to be deposited into a supporting carton. Of course, more than two bags could be deposited into a carton if desired by raising the count required before a filled carton is removed from the illustrated flexible bag processing station including the present invention. If more than one filled bag is to be deposited into a supporting carton, the bag handling apparatus will be lowered to a position such that the first bag will initially be dropped into the carton. In this position, the final filled bag to be deposited into the carton will be at least partially supported by the preceding fill bag or bags. If only one bag is to be deposited, the bag handling apparatus will preferably be lowered to a position such that the one bag is at least partially supported before it is deposited into the carton. A working program for operating the bag handling apparatus 102 by means of an Omron Model SYSMAC-S6 programmable controller is attached hereto as an Appendix.

Correlation of the flow chart and the program of the Appendix is as follows:

Proximity Sensor #1: 212A

Proximity Sensor #2: 212B
Proximity Sensor #3: 125C
Proximity Sensor #4: 125B
Proximity Sensor #5: 125A
Photosensor #1: 118B
Photosensor #2: 157
Photosensor #3: 154
Output Sol. #1: Controls 206
Output Sol. #2: Controls 214
Output Sol. #3: Controls 320
Output Sol. #4: Controls 224
Output Sol. #5: Controls 152
Output Sol. #6: Controls 156

A variety of programmable controllers are available on the market and can be utilized in the present invention. Alternately, relay circuitry can be hard wired to similarly perform the operations described. The construction of the control system will vary upon the specific components utilized or the specific programmable controller employed; however, such construction and programming will be readily apparent to those skilled in the art in view of the present disclosure.

While the method herein described and the forms of apparatus for carrying this method into effect constitute preferred embodiments of this invention, it is to be understood that the invention is not limited to this precise method and forms of apparatus and that changes may be made in either without departing from the scope of the invention which is defined in the appended claims.

APPENDIX -22-

CODING SHEET FOR OMRON SYSMAC-S6 CONTROL

PREPARED BY: WDH

| Add. | OP Code | Relay Set | Remarks |
|------|---------|-----------|---------|
| 000  | LD NOT  | 006       | PHOTOSENSOR # 1 |
| 001  | AND     | 001       | PROXIMITY SENSOR # 1 |
| 002  | LD      | 064       |         |
| 003  | AND NOT | 065       |         |
| 004  | OR LD   |           |         |
| 005  | OUT     | 064       |         |

| | | | |
|---|---|---|---|
| 006 | LD | 002 | PROXIMITY SENSOR # 2 |
| 007 | AND NOT | 005 | PROXIMITY SENSOR # 5 |
| 008 | OUT | 065 | |
| 009 | LD NOT | 004 | PROXIMITY SENSOR # 4 |
| 010 | LD | 066 | |
| 011 | AND NOT | 002 | PROXIMITY SENSOR # 2 |
| 012 | OR LD | | |
| 013 | OUT | 066 | |
| 014 | LD | 064 | |
| 015 | AND | 001 | PROXIMITY SENSOR # 1 |
| 016 | AND NOT | 066 | |
| 017 | LD | 067 | |
| 018 | AND NOT | 066 | |
| 019 | AND | 064 | |
| 020 | OR LD | | |
| 021 | OUT | 067 | |
| 022 | LD NOT | 004 | PROXIMITY SENSOR # 4 |
| 023 | AND | 001 | PROXIMITY SENSOR # 1 |
| 024 | LD | 068 | |
| 025 | AND NOT | 065 | |
| 026 | OR LD | | |
| 027 | OUT | 068 | |
| 028 | LD | 068 | |
| 029 | OUT | 014 | SOL. # 3  BAG CLAMP |
| 030 | LD | 066 | |
| 031 | AND | 004 | PROXIMITY SENSOR # 4 |
| 032 | LD | 074 | |
| 033 | AND | 071 | |
| 034 | OR LD | | |
| 035 | OUT | 074 | |
| 036 | LD | 074 | |
| 037 | OUT | 015 | SOL. # 4  ROTATE |
| 038 | LD | 067 | |
| 039 | LD | 002 | PROXIMITY SENSOR # 2 |
| 040 | AND | 064 | |
| 041 | AND NOT | 008 | PHOTOSENSOR # 1 |
| 042 | OR LD | | |
| 043 | OUT | 013 | SOL. # 2  VERTICAL CYLINDER |
| 044 | LD | 002 | PROXIMITY SENSOR # 2 |
| 045 | AND | 003 | PROXIMITY SENSOR # 3 |

APPENDIX -23-

| | | | | |
|---|---|---|---|---|
| 046 | AND NOT | 064 | | |
| 047 | LD | 069 | | |
| 048 | AND NOT | 064 | | |
| 049 | OR LD | | | |
| 050 | OUT | 069 | | |
| 051 | LD | 069 | | |
| 052 | TIM | 001 | 010 | |
| 053 | LD NOT | 004 | | PROXIMITY SENSOR # 4 |
| 054 | AND | 001 | | PROXIMITY SENSOR # 1 |
| 055 | LD | 064 | | |
| 056 | AND | 070 | | |
| 057 | OR LD | | | |
| 058 | OUT | 070 | | |
| 059 | LD | 070 | | |
| 060 | AND | 003 | | PROXIMITY SENSOR # 3 |
| 061 | AND | 064 | | |
| 062 | LD | 071 | | |
| 063 | AND NOT | 069 | | |
| 064 | OR LD | | | |
| 065 | OUT | 071 | | |
| 066 | LD | 071 | | |
| 067 | OUT | 012 | | SOL. # 1  TRAVERSE |
| 068 | LD | 065 | | |
| 069 | LD TIM | 002 | | |
| 070 | CNT | 001 | 002 | |

```
071    LD CNT           001
072    AND              004            PROXIMITY SENSOR # 4
073    LD               072
074    AND NOT TIM      002
075    OR LD
076    OUT              072
077    LD NOT           072
078    LD TIM           002            PROXIMITY SENSOR # 2
079    OR LD
080    OUT              016            SOL. # 5  CARTON STOP
081    LD               008            PHOTOSENSOR # 3
082    TIM              002    002
083    LD NOT           008            PHOTOSENSOR # 3
084    AND NOT          007            PHOTOSENSOR # 2
085    LD NOT TIM       003
086    AND              073
087    OR LD
088    OUT              073
089    LD               073
090    OUT              017            SOL. # 6  CARTON SNUBBER
091    LD               008
092    TIM              003    005
093    END
```

APPENDIX -24-

CODING SHEET FOR OMRON SYSMAC-S6 CONTROL

PREPARED BY: WDH

==================================================================
TIMER SETTINGS
------------------------------------------------------------------

TIMER    SETTING       SECONDS

000      NOT USED
001      002           .2
002      002           .2
003      005           .5
004 THRU 007 NOT USED

==================================================================
COUNTERS
------------------------------------------------------------------

CNT      SETTING       FUNCTION

000      NOT USED
001      002           NUMBER OF BAGS TO BE PLACED IN CARTON
002 THRU 007 NOT USED

==================================================================
IN / OUT ASSIGNMENT TABLE
------------------------------------------------------------------

I/O No.           DESCRIPTION

000               NOT USED
001               INPUT  PROXIMITY SENSOR # 1
002               INPUT  PROXIMITY SENSOR # 2
003               INPUT  PROXIMITY SENSOR # 3
004               INPUT  PROXIMITY SENSOR # 4
005               INPUT  PROXIMITY SENSOR # 5
006               INPUT  PHOTOSENSOR # 1
007               INPUT  PHOTOSENSOR # 2

```
008                INPUT  PHOTOSENSOR # 3
009                NOT USED
010                NOT USED
011                NOT USED
012                OUTPUT  SOL. # 1    TRAVERSE CYLINDER
013                OUTPUT  SOL. # 2    VERTICAL CYLINDER
014                OUTPUT  SOL. # 3    CLAMP CYLINDER
015                OUTPUT  SOL. # 4    ROTATE CYLINDER
016                OUTPUT  SOL. # 5    CARTON STOP CYLINDER
017                OUTPUT  SOL. # 6    CARTON SNUBBER CYLINDER
018                NOT USED
019                NOT USED
```

What is claimed is:

1. Apparatus for handling flexible plastic bags filled with liquid comprising: bag supporting means for supporting said bags in a substantially flat horizontal orientation having a substantially flat upper surface, said supporting means defining a pick-up location for flexible plastic bags filled with liquid;

bag gripper means for gripping said liquid filled flexible plastic bags and comprising a pair of clamping members defining enlarged bag clamping faces, means opening and closing said members to progressively engage a substantial portion of the flat upper surfaces of said bags between the clamping faces, and resilient means secured to said enlarged bag clamping faces to grip said bags without damage thereto;

bag transport means for supporting said bag gripper means and for vertically and horizontally moving said bag gripper means between said pick-up location and a drop-off location; and sequencer means for controlling said bag transport means and said gripper means such that flexible plastic bags filled with liquid are engaged by said bag gripper means at said pick-up location, vertically raised clear of said pick-up location, horizontally carried from said pick-up location to said drop-off location, and vertically lowered to be deposited at said drop-off location.

2. Apparatus for handling flexible plastic bags filled with liquid as claimed in claim 1 wherein said resilient means comprises resilient clamping pads formed of 70 durometer polyurethane and completely covering said enlarged bag clamping faces.

3. Apparatus for handling flexible plastic bags filled with liquid comprising: bag supporting means for supporting said bags in a substantially flat horizontal orientation having a substantially flat upper surface, said supporting means comprising an indexing conveyor for defining a pick-up location for liquid filled flexible plastic bags and for conveying said bags from a filling machine to said pick-up location;

bag gripper means for gripping said liquid filled flexible plastic bags and comprising a pair of clamping members defining enlarged bag clamping faces, means opening and closing said members to engage a substantial portion of the flat upper surfaces of said bags between the clamping faces, and resilient means secured to said clamping faces for engaging liquid filled flexible plastic bags, the combination of said enlarged bag clamping faces and said resilient means adapting said bag gripper means for engagement with said liquid filled flexible plastic bags without damage to said bags;

bag transport means for supporting said bag gripper means for vertical and horizontal movement of said bag gripper means between said pick-up location and a drop-off location, and for rotational movement relative to said bag transport means;

container conveyor means for conveying relatively rigid containers to said drop-off location whereat filled flexible bags are inserted into said containers by said apparatus;

first sensing means mounted adjacent to said indexing conveyor for sensing the presence of liquid filled flexible plastic bags at said pick-up location and for generating filled bag present signals indicative thereof;

second sensing means mounted adjacent to said container conveyor means for sensing the presence of a container at said drop-off location and for generating container present signals indicative thereof;

bag gripper height sensor means coupled to said bag gripper means for sensing the vertical position of said bag gripper means and for generating vertical position signals representative thereof; and sequencer means responsive to said filled bag present signals, said container present signals and said vertical position signals for controlling said bag transport means and said gripper means such that liquid filled flexible plastic bags are engaged by said bag gripper means at said pick-up location, vertically raised clear of said pick-up location, horizontally carried from said pick-up location to said drop-off location, rotated relative to said transport means to properly align filled bags with containers into which the filled bags are to be inserted, and vertically lowered to be deposited into said containers at said drop-off location.

4. Apparatus for handling flexible plastic bags filled with liquid as claimed in claim 3 wherein said resilient means comprises resilient clamping pads formed of 70 durometer polyurethane and completely covering said enlarged bag clamping faces.

* * * * *